Oct. 23, 1951  E. H. THOMPSON ET AL  2,572,541
SELECTIVE BEVERAGE VENDING MACHINE
Filed May 22, 1947  9 Sheets-Sheet 1
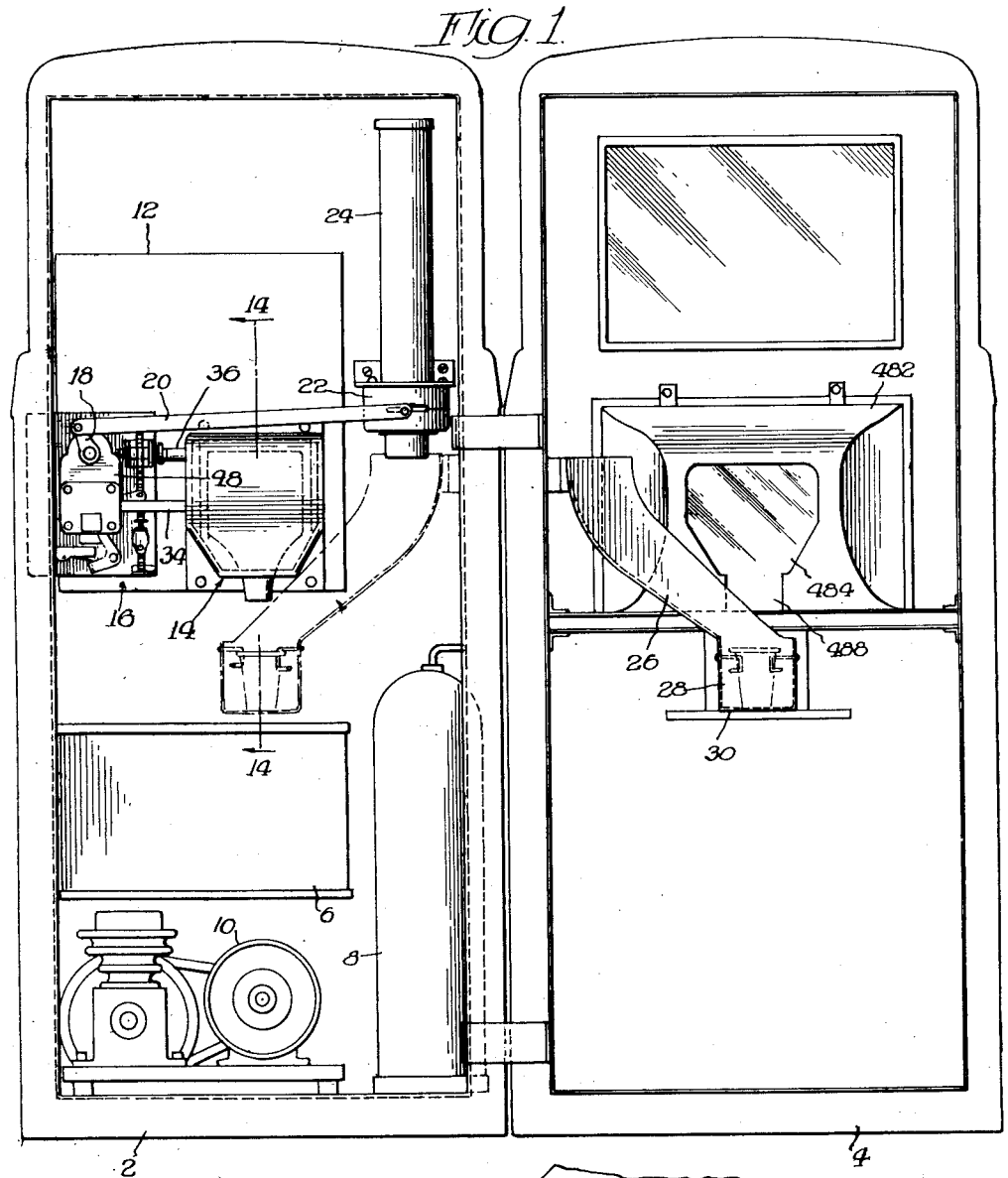
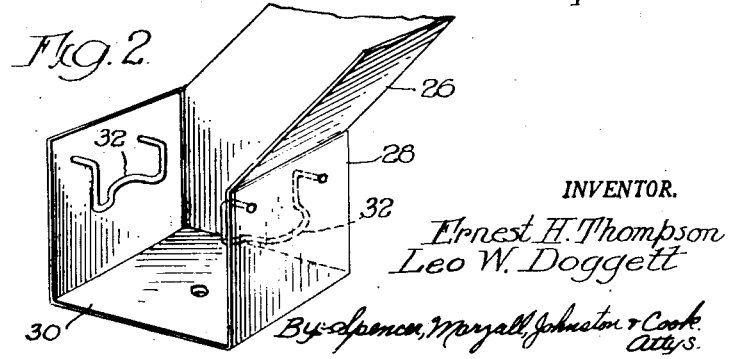
INVENTOR.
Ernest H. Thompson
Leo W. Doggett
By Spencer, Maryall, Johnston & Cook
Attys.

Oct. 23, 1951     E. H. THOMPSON ET AL     2,572,541
SELECTIVE BEVERAGE VENDING MACHINE
Filed May 22, 1947     9 Sheets-Sheet 2
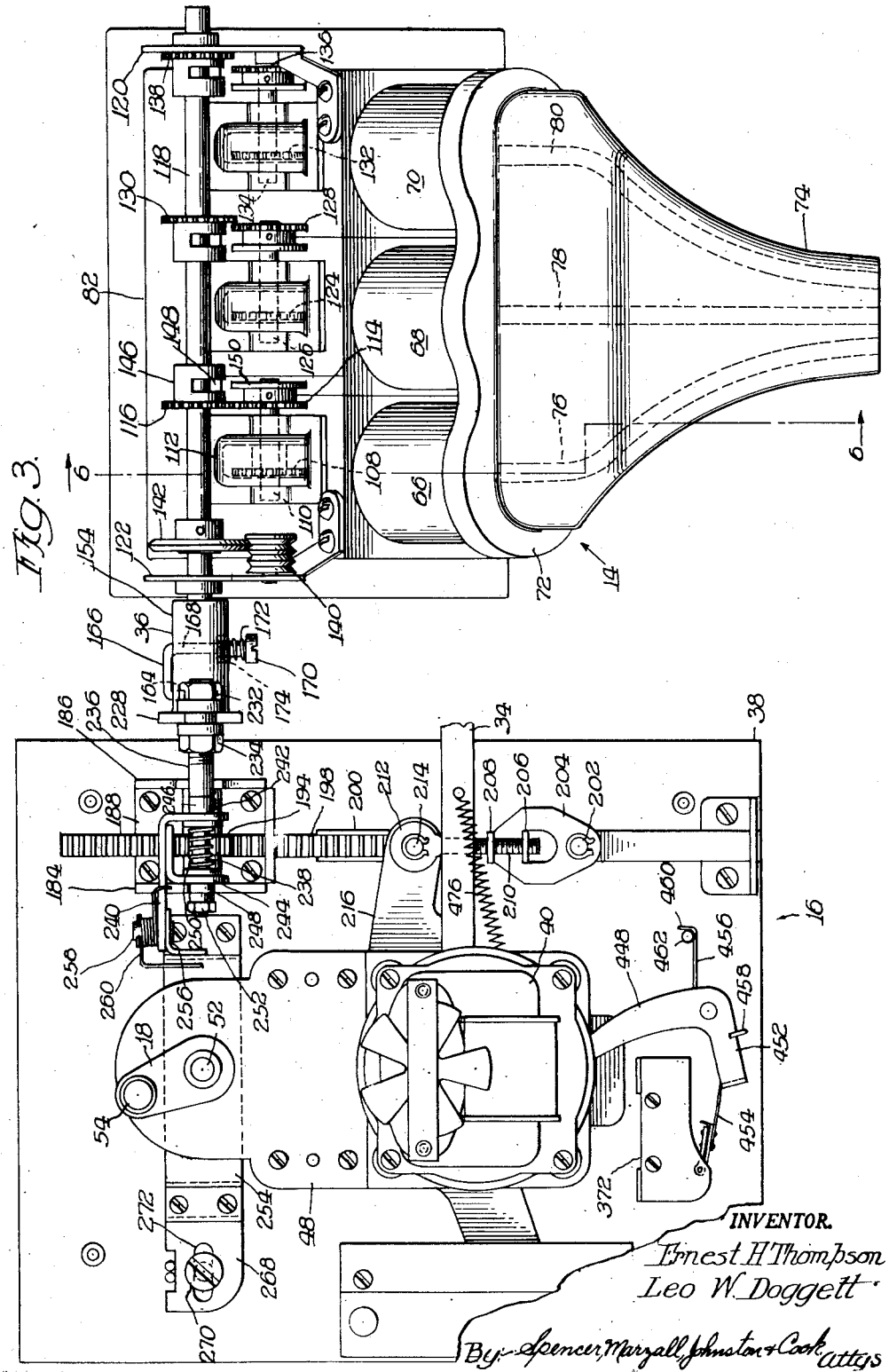
INVENTOR.
Ernest H Thompson
Leo W. Doggett
By: Spencer, Marzall, Johnston & Cook
attys

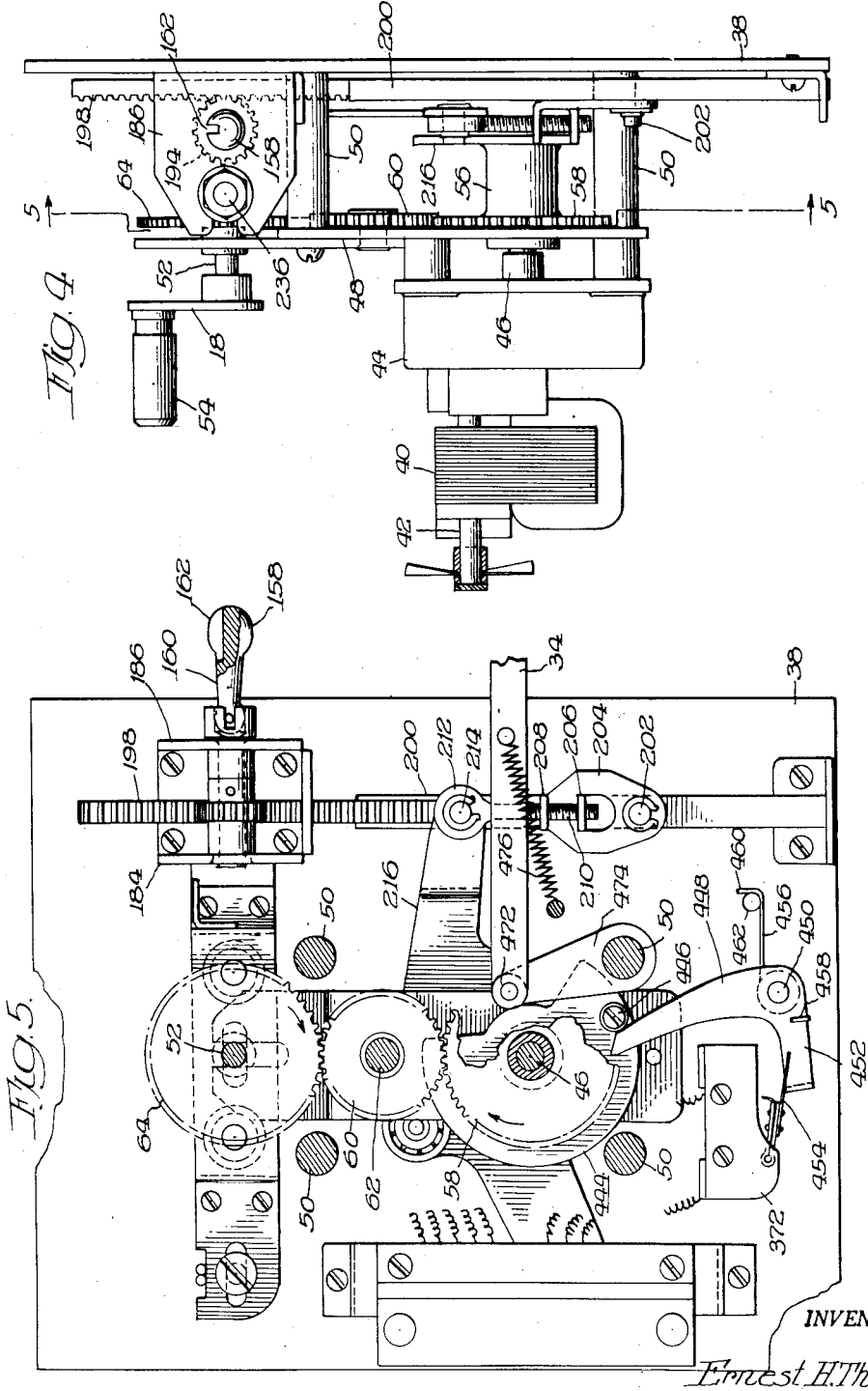

Oct. 23, 1951     E. H. THOMPSON ET AL     2,572,541
SELECTIVE BEVERAGE VENDING MACHINE
Filed May 22, 1947     9 Sheets-Sheet 4
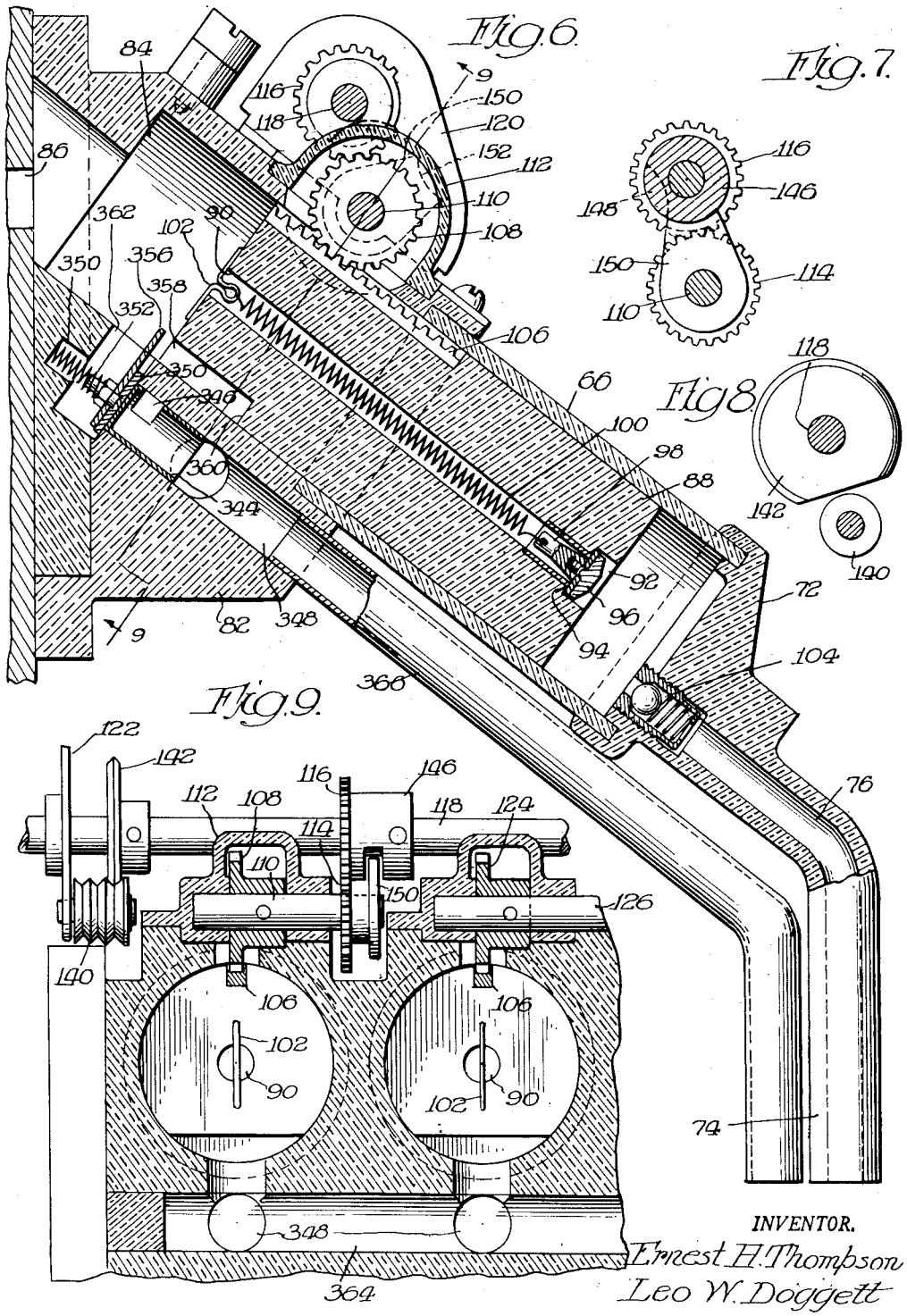
INVENTOR.
Ernest H. Thompson
Leo W. Doggett
By Spencer, Marzall, Johnston & Cook
Attys.

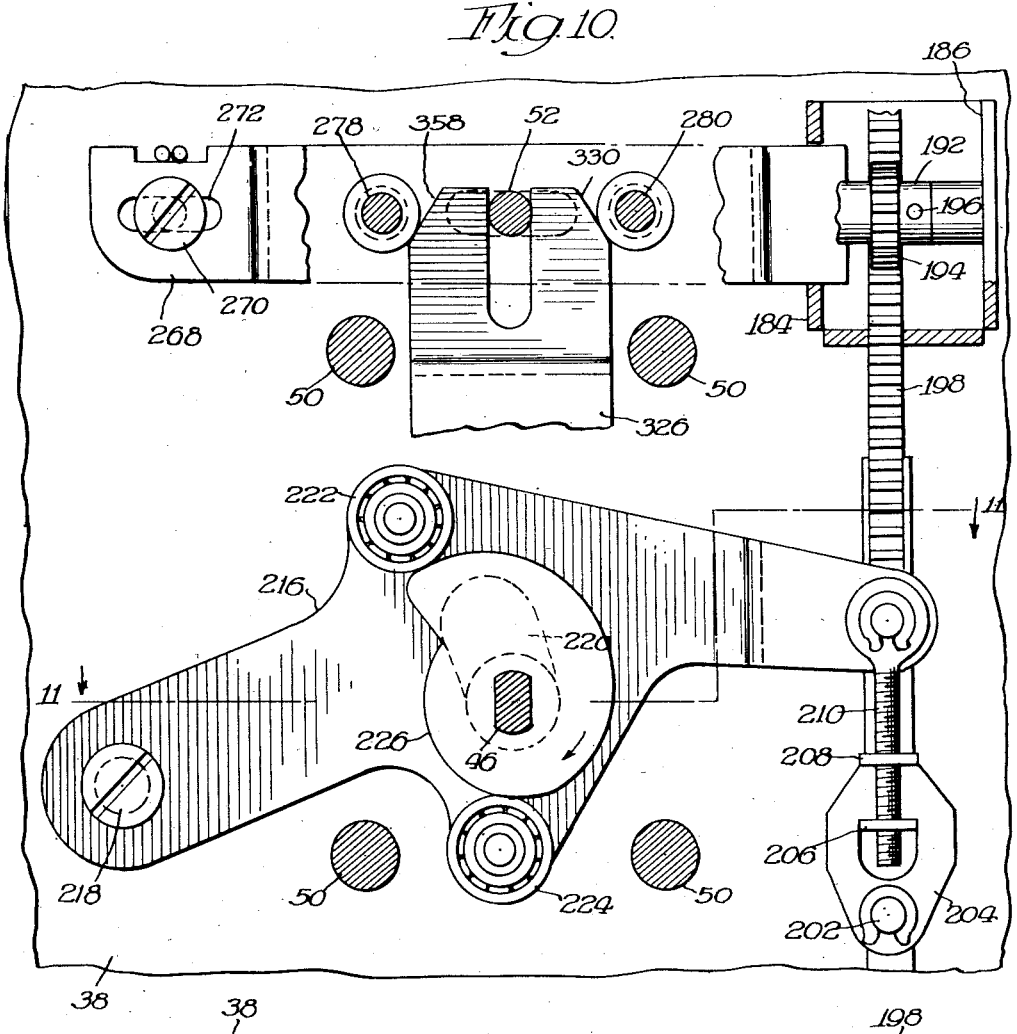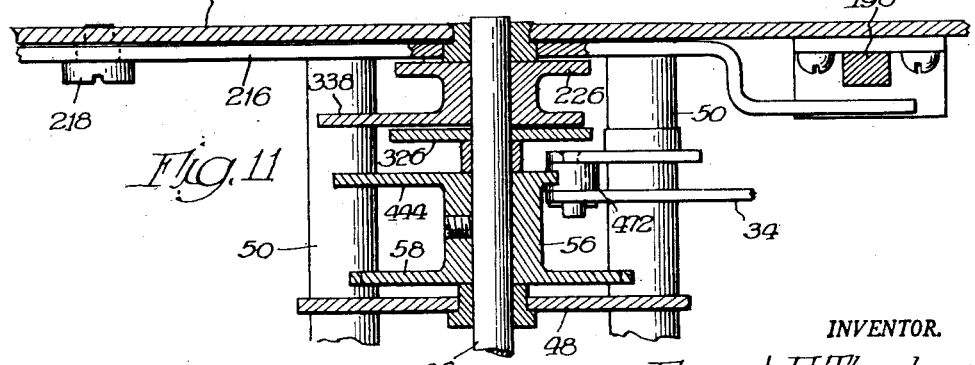

Oct. 23, 1951  E. H. THOMPSON ET AL  2,572,541
SELECTIVE BEVERAGE VENDING MACHINE
Filed May 22, 1947  9 Sheets-Sheet 6
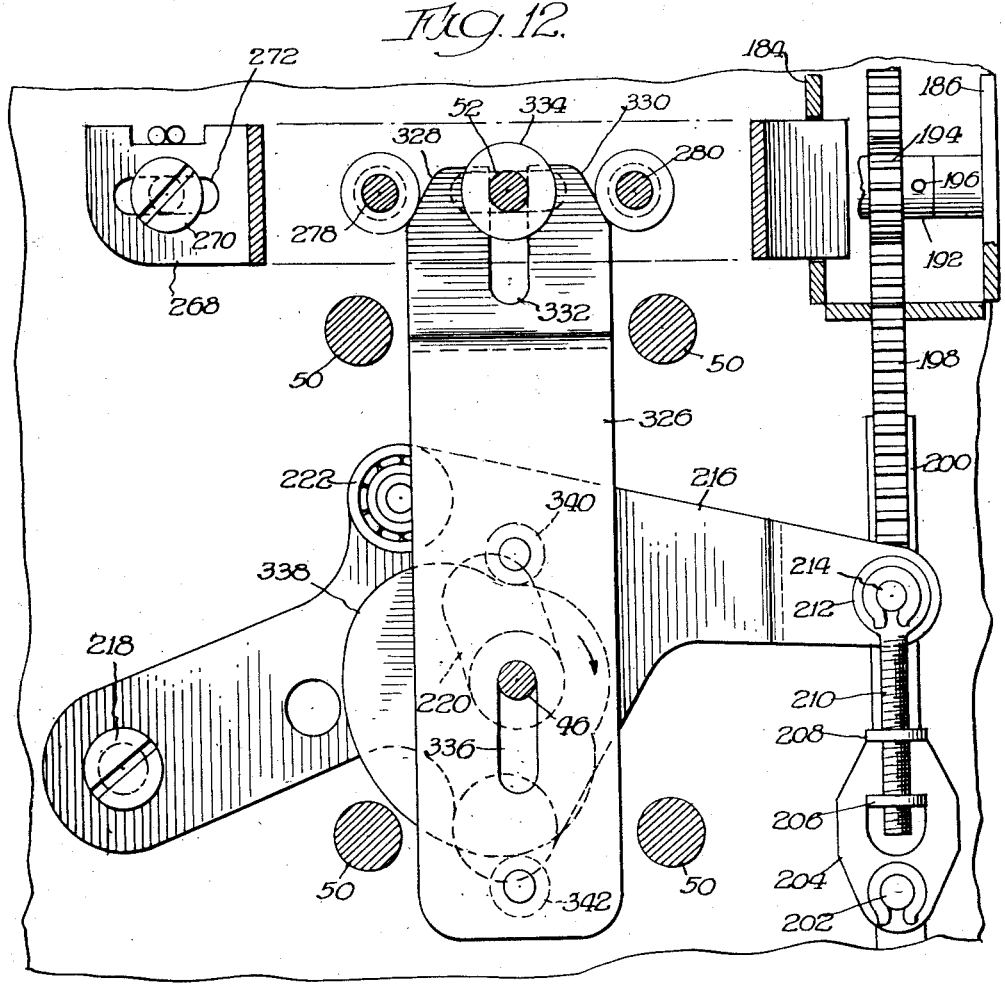
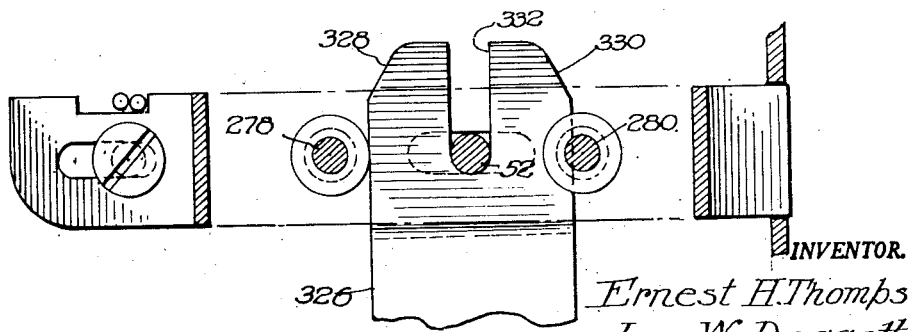
INVENTOR.
Ernest H. Thompson
Leo W. Doggett
By Spencer, Marzall, Johnston & Cook Attys.

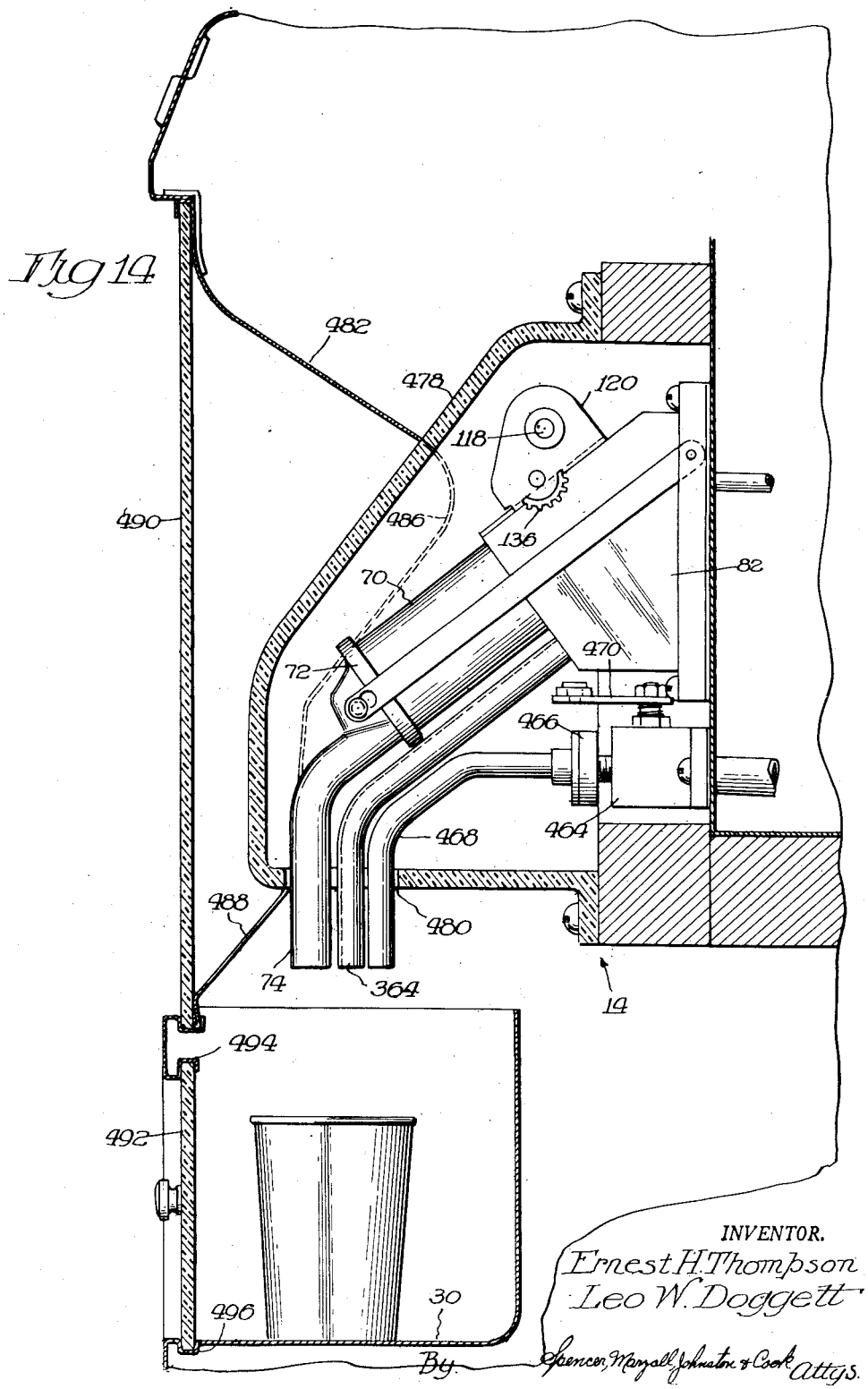

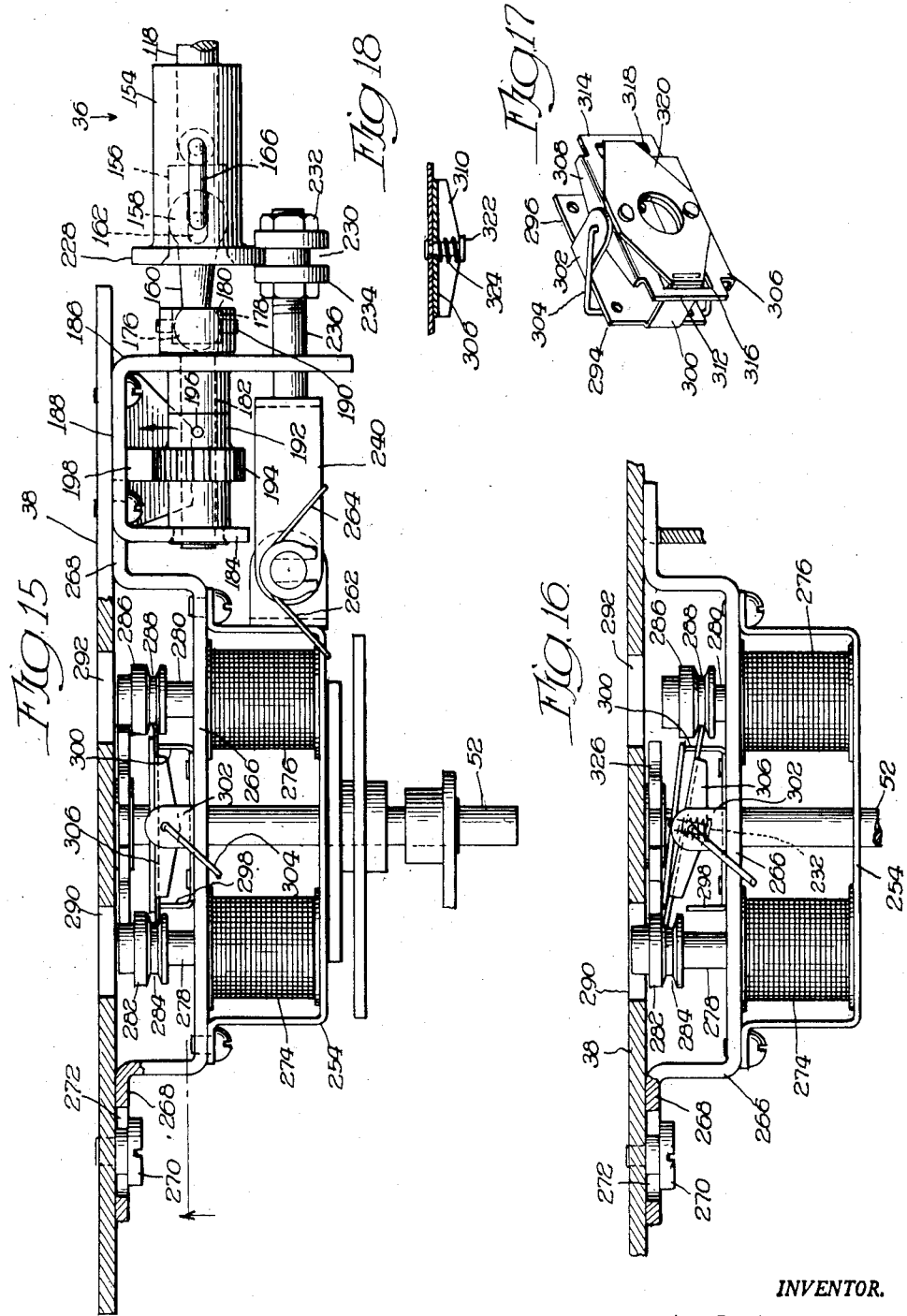

Oct. 23, 1951  E. H. THOMPSON ET AL  2,572,541
SELECTIVE BEVERAGE VENDING MACHINE
Filed May 22, 1947  9 Sheets-Sheet 9

INVENTOR.
Ernest H. Thompson
Leo W. Doggett
By Spencer, Marzall, Johnston & Cook
attys.

Patented Oct. 23, 1951

2,572,541

UNITED STATES PATENT OFFICE 2,572,541

SELECTIVE BEVERAGE VENDING MACHINE

Ernest H. Thompson, Glenview, and Leo W. Doggett, Park Ridge, Ill., assignors to Automatic Canteen Company of America, Chicago, Ill., a corporation of Delaware Application May 22, 1947, Serial No. 749,694

8 Claims. (Cl. 225—21)

This invention relates in general to beverage vending machines and more particularly to a coin-controlled selective beverage vending machine of the general character disclosed in the Thompson and Doggett Patent No. 2,376,403, wherein a beverage is prepared by the machine by dispensing and mixing together the essential ingredients of the beverage such as, for example, a syrup and carbonated water. The invention further relates to a beverage vending machine of the character wherein a cup or other type of receptacle is automatically and simultaneously provided for receiving the beverage.

The general nature of the present machine embodies improved mechanism which offers a selection from a plurality of beverages, any one of which is automatically dispensed and mixed when a proper coin has been deposited in the machine and the desired beverage has been selected.

There have been many various types of selective beverage vending machines in use heretofore. In some of these machines the beverage is prepared before it is supplied to the apparatus, thus requiring no mixing by the machine itself. This type has been conveniently termed a "pre-mixed drink vending apparatus." Another type, such as that disclosed in the above referred to issued patent, includes a mixing chamber wherein the beverage ingredients are delivered to the chamber, then mixed, and finally dispensed into the receptacle.

These machines may be distinguished from the apparatus disclosed herein in that the present machine is so designed as to dispense the beverage ingredients directly into the receptacle where they are mixed in the presence and view of the customer. While the specific apparatus illustrated herein is particularly designed for use in dispensing beverages wherein the ingredients are syrup and carbonated water, the apparatus is so designed as to admit of the dispensing of other ingredients or a pre-mixed beverage or a beverage which is complete in itself, by making a few minor changes in the mechanical details, such as the amount of liquid dispensed.

It is considered advantageous from a sales standpoint to permit the customer to actually view the dispensing and mixing of the beverage ingredients. One phase of the present invention is directed toward this end and the provision of proper mechanism to permit this result involves certain problems not heretofore encountered when the dispensing and mixing are done within the machine and out of sight of the customer.

Furthermore, in previous machines of a selective nature, complicated electrical circuits have been necessary for actuating electric selective means for making the proper selection of the beverage to be dispensed. The present invention has simplified both the mechanical and electrical details in providing a novel selecting means as well as driving means for actuating the dispensing mechanism.

Having the above considerations in mind, then, it is one of the principal objects of the present invention to provide, in a beverage vending machine, wherein any one of a number of beverage ingredients may be dispensed and mixed with carbonated water, a novel selective means for selecting a particular beverage or beverage ingredient.

Another object is to provide a selective beverage vending machine wherein positive drive means are utilized to actuate selected dispensing means for dispensing one of a plurality of beverages or beverage ingredients.

A further object is to provide a selective beverage vending machine wherein valve mechanism including a plurality of individual containers, each connected to a separate source of supply for beverage ingredients, have dispensing means associated therewith, and a selective mechanism is provided which is caused to select and then actuate a selected dispensing means to thereby dispense a selected beverage or beverage ingredient.

Still another object is to provide a selective beverage vending machine wherein a plurality of cylinders, each having a reciprocable piston therein, are each connected to a separate source of supply for beverage ingredients, and a longitudinally shiftable selector shaft is caused to select and actuate a selected piston to thereby dispense a selected beverage.

Another object is to provide a selective beverage vending machine wherein a simplified and more efficient selective mechanism than those heretofore used may be electrically operated for dispensing a selected beverage or beverage ingredient.

Still another object is to provide in a selective beverage vending machine novel means for draining the beverage or beverage ingredient from the source of supply and the conduits connected therewith when it is desired to change the beverage dispensed therefrom to a different kind.

A still further and more specific object is to provide a novel form of selective beverage vending machine wherein the actual dispensing and mixing of the beverages may be viewed by a customer.

Another object is to provide a transparent dispensing apparatus in a beverage vending machine whereby the dispensing and mixing of beverage ingredients may be actually viewed by a customer.

Other objects and advantages of the invention will become apparent upon reading the following description taken in connection with the accompanying drawings in which:

Fig. 1 is a front elevational view of the cabinet showing the door thereon in fully open position and indicating in a general way the location and features of the present invention therein;

Fig. 2 is a somewhat enlarged fragmentary perspective view of the cup receiving platform;

Fig. 3 is an enlarged front elevational view of the transparent syrup or beverage dispensing valve assembly and the selector drive mechanism therefor;

Fig. 4 is a side elevational view of the selective means and driving mechanism therefor shown at the lefthand side of Fig. 3;

Fig. 5 is a front elevational view of the selective means and drive mechanism shown in Fig. 3 with certain parts removed to more clearly show details and taken substantially along the plane of line 5—5 of Fig. 4;

Fig. 6 is a somewhat enlarged sectional view of one of the dispensing means in the transparent valve assembly taken substantially along the plane of line 6—6 of Fig. 3 wherein the dispensing piston is shown in a partially retracted position;

Fig. 7 is a vertical section through the slidable or shiftable selector shaft of the driving means showing the position thereof when a non-selected piston is locked against movement;

Fig. 8 is a side elevational view of the locking means which prevents longitudinal sliding movement of the selector shaft, and shown in its position to permit such movement when a selection is being made;

Fig. 9 is a transverse section taken substantially along the plane of line 9—9 of Fig. 6;

Fig. 10 is a further enlarged fragmentary front elevational view of the mechanism shown in Fig. 5 with further parts removed to show details;

Fig. 11 is a horizontal sectional view taken substantially along the plane of line 11—11 of Fig. 10;

Fig. 12 is a view of the selecting and driving means similar to Figs. 5 and 10 with still different parts removed to show details;

Fig. 13 is a fragmentary elevational view of certain mechanism shown in Fig. 12 showing the selector bar in its elevated or selecting position;

Fig. 14 is an enlarged vertical transverse sectional view through the transparent dispensing unit or valve assembly taken substantially along the plane of line 14—14 of Fig. 1;

Fig. 15 is a top plan view, partly in section, of the selecting and driving mechanism shown in Fig. 3;

Fig. 16 is a fragmentary sectional plan view similar to Fig. 15 showing the selector solenoids in one of the actuated positions;

Fig. 17 is a perspective view of the centering device for the selecting mechanism;

Fig. 18 is a fragmentary horizontal sectional view through the centering device showing a detail thereof.

Figure 19:
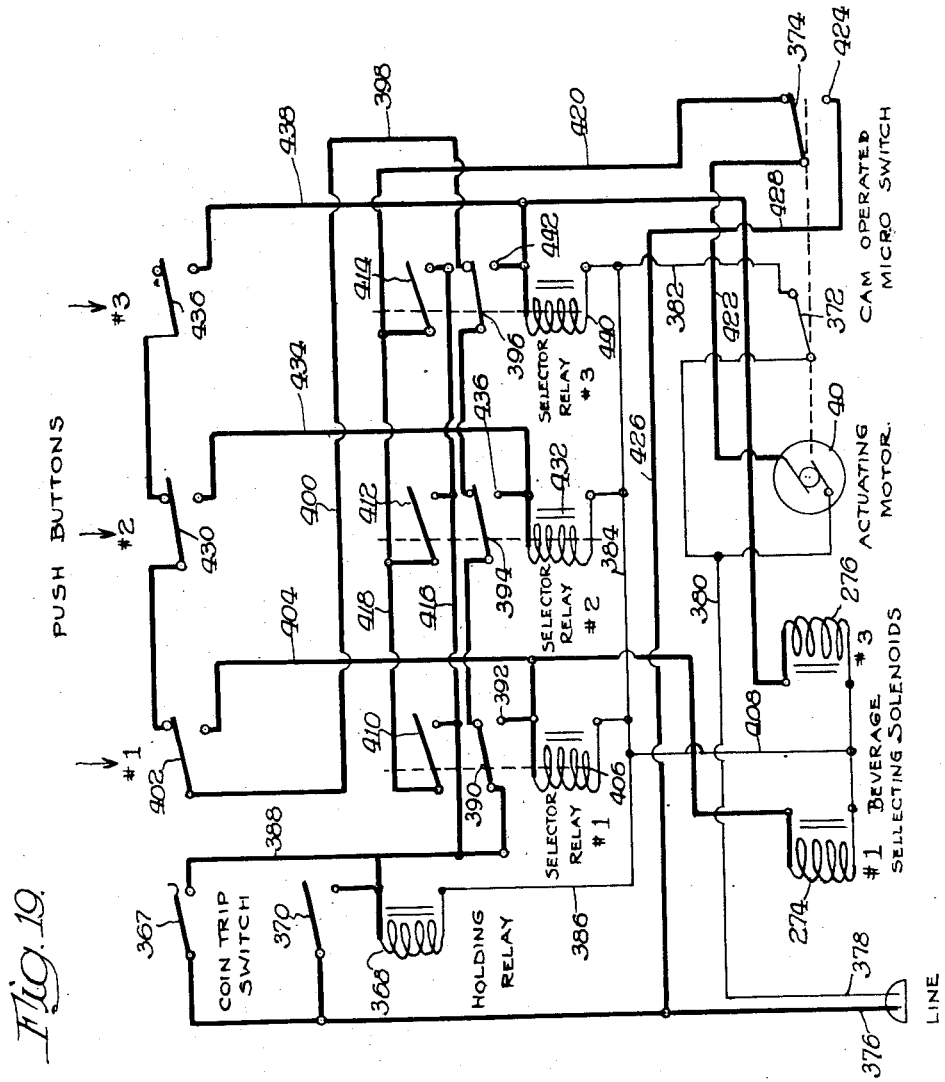
Fig. 19 is a schematic wiring diagram.

Referring for the moment to Fig. 1, the general arrangement of the various parts embodying the present invention are shown as they may be located within a vending machine cabinet. Some of the details of the machine, such as the coin mechanism, external controls and other parts which form no part of the present invention have been omitted from the drawings since they are adequately disclosed in the above referred to Thompson and Doggett issued patent. In general, a cabinet 2 is provided having a door 4 thereon which may be opened as indicated in Fig. 1 or may be closed to present a pleasing external appearance when the machine is in actual use. A suitable water tank 6 may be located at any desired position within the cabinet 2 and may have the necessary connections to the carbon dioxide tank 8 positioned adjacent thereto. In the customary machines of this character, a suitable carbonator is provided where the carbon dioxide gas is mixed with the water to thus become carbonated whereupon it may be dispensed with the syrup to form a carbonated beverage.

Since the beverage ingredients, in a machine of this character, must be kept cold at all times, a suitable refrigerating compressor 10 is also located within the cabinet. A compartment 12 is provided with a suitable number of containers for the storage of beverage ingredients, such as syrup, which may be communicated to and dispensed through the valve assembly generally indicated at 14. The numeral 16 represents generally the selecting and driving means together with the motive means for the operation thereof, and which also operates a crank 18, connected by the link 20 to the usual form of cup dispenser 22. A stack of nested cups may be disposed within the tubular container 24 above the cup dispenser so that upon actuation of the link 20, due to rotation of the crank 18, the cup dispenser 22 will be operated to dispense a cup into the chute 26 mounted on the inside of the door 4 and which terminates at its lower end in a supporting chamber 28 having a bottom 30 and suitable supporting guides 32 therein.

Any convenient form of cup dispenser may be used since it forms no part of the present invention other than its operation in properly timed relation to the other mechanical movements of the machine which take place during a complete cycling thereof.

For purposes of convenience and ease in understanding the various aspects of the present invention, the disclosure may be divided into the following categories:

1. The cup dispensing mechanism.
2. The transparent dispenser or valve assembly and the actuators therefor.
3. The selector mechanism.
4. The draining mechanism.
5. The electrical circuit.
6. The visibility feature.

It is to be understood that the invention herein resides not only in the individual assemblies and mechanisms outlined above, but also in the combination of the various elements which are all actuated in timed relation to bring about a unitary result. This is true whether or not some of the specific parts or movements of the apparatus of themselves may be old and well known to those skilled in the art in other surroundings.

The machine, and the particular improvements to which the invention is directed, may be briefly described as being provided with a plurality of valves, each connected with a source of supply for beverage ingredients, whereby actuation of any one of the valves will dispense a beverage. Novel selecting mechanism is responsive to the actuation of an external control by a customer to select a particular valve to be actuated, and the selecting mechanism also operates to actuate the valve selected to dispense the beverage ingredient therein. Motive means in the form of an electric motor provides the driving power for all of the various operations of the machine. A main shaft rotated by the motor has a plurality of cams thereon, one of which actuates the carbonated water valve, one the selector bar and the other causes the actuation of the dispensing valves. A gear train is adapted to operate the cup dispenser and an electrical circuit is arranged in such a way as to become energized upon the deposit of an acceptable coin and to operate the motive means after a selection has been made. The arrangement is such that once the selection has been made, the machine will operate through one complete cycle before stopping, regardless of what the customer may do, such as operating other external controls or depositing additional coins.

As stated above the valve assembly is preferably made of a transparent material so that the colorful liquid such as syrup may be seen by the customer as it is being delivered to the receptacle for mixing with the carbonated water. The manner of locating the valve assembly and the construction of the cabinet to permit such viewing to occur will be described in more detail after the complete operation of the machine has been explained.

In order to identify the connecting means between the driving assembly 16 and the valve assembly 14, the link 34 actuates a suitable carbonated water valve during the cycling of the machine and the connecting link or coupling, generally indicated at 36, performs the operation of selecting and actuating a selected valve.

Referring momentarily to Figs. 3, 4 and 5, the mechanism which is common to all of the operations involved includes a main mounting plate 38 adapted to support an electric motor 40 which has a shaft 42 passing therethrough into a housing 44 containing any suitable type of speed reducing mechanism. The shaft 46, extending rearwardly from the speed reducer, has mounted thereon in a small and compact space all of the various elements which cause a proper cycling of the machine.

An auxiliary mounting plate 48 is disposed in spaced relation to the main plate 38 and is secured thereto by means of the spacer bolts 50.

The cup dispensing mechanism

The auxiliary mounting plate 48 is adapted to support one end of a shaft 52 which is mounted thereon in suitable bearings for rotation. The crank arm 18 is mounted on the forward end of the shaft 52 and has a crank handle 54 connected to the link 20. The opposite end of the link, as mentioned above, is secured to one of the usual and well known forms of cup dispensing mechanism.

The shaft 46 has a sleeve 56 mounted thereon and secured thereto, at the forward end of which a gear 58 is mounted so that when the shaft 46 is rotated by means of the motor 40, a rotation of the gear 58 will take place. An intermediate gear 60 is mounted on the stud shaft 62 immediately above the gear 58 and so located on the plate 48 as to be in mesh therewith.

A third gear 64 is secured to the shaft 52 so that rotation thereof will revolve the crank 54 and cause a longitudinal reciprocation of the link 20.

It will thus be evident that operation of the motor 40 will rotate the shaft 46 at a reduced speed and will thus rotate the gear 58 mounted thereon. This rotation of the gear 58 will impart a rotative movement to the shaft 52 through the gears 60 and 64. Thus, when the motor 40 begins to operate, the link 20 will immediately be moved in a direction to operate the cup dispenser and project the cup through a chute 26 to a support 30 immediately below the valve unit where the liquid is dispensed. One complete revolution of the shaft 52 will complete a cycle of operation of the machine whereupon the link 20 will be returned to a position in readiness for the dispensing of another receptacle upon the next cycle of the machine.

The transparent dispenser or valve assembly and the actuators therefor

The valve assembly for the dispensing of a selected beverage ingredient, such as a syrup for carbonated beverages, includes a plurality of valves which, in the present instance, comprises the cylinders 66, 68 and 70 (Fig. 3). In the embodiment shown, these cylinders are also formed of a suitable transparent material and each has a connection to one of the containers for the beverage ingredients.

In referring particularly to Figs. 3, 6 and 9, it will be noted that the forward or outer ends of the cylinders lead into and are enclosed by a manifold structure 72 which is also preferably formed of a transparent material. This manifold 72 terminates at its forward lower end in a spout 74 and is provided with the same number of passages as there are cylinders, these passages being indicated by the numerals 76, 78 and 80. The form of these passages may be seen in Fig. 3 where the passage 76 is shown in communication with the cylinder 66, the passage 78 in communication with the cylinder 68 and the passage 80 in communication with the cylinder 70. Thus it will be evident that when a selected beverage ingredient is dispensed through one of the cylinders, it will pass outwardly through the corresponding passage into a suitable receptacle provided therefor as above explained.

A mounting block or housing 82, also of a transparent material, is adapted to receive the various cylinders and the manifold 72 for mounting the resulting unitary structure on the front side of the compartment 12 within which the individual beverage ingredient containers are located. The supporting structure 82 has a plurality of cylindrical openings 84 therein, each of which is in alignment with the inner surface of the cylinders 66, 68 and 70, and also has a communicating opening 86 to the beverage ingredient containers. This will permit a beverage ingredient to be located within the upper end of each of the cylindrical openings 84 at all times as long as there is any such ingredient present.

The valve or dispensing means includes a reciprocating piston 88 located in each of the cylinders formed by the opening 84 communicating with the inner surface of the cylinders 66, 68 and 70. An elongated opening or passage 90 is located within each piston 88 and extends longitudinally therethrough, terminating at its lower forward end in a slightly enlarged portion 92 to thereby provide an annular shoulder 94 against which a check valve 96 is adapted to normally bear. The inner portion of the check valve 96 has an elongated extension 98 to which one end of a coiled tension spring 100 is secured. This spring extends upwardly through the passage 90 and has its upper end fastened to a suitable hook or other securing means 102 which is of such a construction as to permit fluid to pass downwardly through the passage 90 and yet retain the spring 100 in proper position at all times.

A suitable check valve 104 is also positioned at the upper end of each of the passages 76, 78 and 80 so that when a selected piston 88 is moved upwardly, a suction will be created at its lower end which will open the valve 96 and draw a measured quantity of the ingredient downwardly through the passage 90 and within the space of the cylinder at the bottom of the piston. When a sufficient and proper measured quantity of the ingredient has been drawn into the cylinder, which will occur when the piston has reached its uppermost limit of travel for the dispensing operation, it will then be moved downwardly by suitable mechanism to be described hereinafter, at which time valve 96 will be closed and valve 104 will be opened to permit the beverage ingredient to be dispensed through one of the selected passages 76, 78 or 80. Since the cylinders, pistons, manifold and spout are all transparent, the colored liquid or syrup can be seen as it is drawn from the storage tanks and when it is dispensed.

In general, the means or mechanism which I have provided to reciprocate a selected piston includes a rack 106 mounted on the upper portion of each of the pistons 88 and on the top side thereof. The actuation of each piston is identical, and a description of the operation of one will suffice for all. It will be understood, however, that the operation of the selector means will select one of the pistons to be actuated while the others remain stationary. Viewing Figs. 6 and 9, it will be seen that a pinion 108 secured to a short rotatable shaft 110 is adapted to be in engagement with the rack 106 whereby rotation of the pinion 108 in one direction (clockwise as viewed in Fig. 6) will cause the upstroke of the piston 88 to take place, at which time a beverage ingredient will be delivered to the lower end of its cylinder as above explained. Rotation of the pinion in the opposite direction will then cause the dispensing operation to take place.

The shaft 110 is mounted for rotation in a suitable housing 112 which may also be formed of a transparent material, the mounting thereof being clearly shown in Fig. 9. Adjacent the outer end of the shaft 110 there is provided a small gear 114 adapted to be in mesh with a mutilated gear 116 secured to the shiftable and rotatable selector shaft 118, this shaft being suitably mounted for longitudinal shifting and rotating in bearings located in the brackets 120 and 122 (see Fig. 3). The above detailed description of the operating mechanism for dispensing a beverage ingredient has been with particular reference to the cylinder 66, but the same operation will take place if one of the other beverage ingredients have been selected, whereupon suitable actuating means associated with the cylinders 68 and 70 will become operative. The mutilated gear 116 facilitates the shifting of the selector shaft on which it is mounted to obviate the necessity of having the gears 114 and 116 in true alignment for meshing when the shifting occurs.

A piston 88 and its rack 106 will be located in each of the other cylinders 68 and 70, and with regards to the cylinder 68 its pinion 124 is mounted on a similar shaft 126 whereby rotation thereof will impart a reciprocating movement to the rack and piston connected thereto. A similar small gear 128 is connected to the outside of the shaft 126 and is adapted to become engaged with the mutilated gear 130 also secured to the selector shaft 118.

Regarding the cylinder 70, which also contains a piston 88 and a rack 106, the pinion 132 mounted on the shaft 134 will at all times be in engagement with the rack associated therewith so that rotation thereof will cause rotation of the pinion and reciprocation of the piston therein. A gear 136 is mounted adjacent the end of the shaft 134 and is adapted to become engaged with a mutilated gear 138 also mounted on the selector shaft 118.

It will be evident that the respective pinions 108, 124 and 132 together with the shafts on which they are mounted are stationary except for the rotary movement which is imparted to one of them during the dispensing operation. The mutilated gears 116, 130 and 138 are so located on the selector shaft 118 that only one will become engaged with one of the gears 114, 128 and 136 at any one time. The position of the various parts as shown in Fig. 3 shows the selector shaft 118 in its extreme righthand position where the mutilated gear 116 thereon is in engagement with the gear 114 so that the piston within the cylinder 66 is actuated. If the customer should select a beverage ingredient to be dispensed through the cylinder 68 and its connected passage 78, suitable selector means to be described hereinafter will be actuated to longitudinally shift the selector shaft toward the left from its position in Fig. 3 to a position where the gear 130 will be engaged with the gear 128. In this position, the mechanism above described will cause a reciprocation of the piston located within the cylinder 68 to thereby dispense the selected beverage ingredient.

Likewise, if the selected ingredient is the one to be dispensed through the cylinder 70, then the selector mechanism will shift the selector shaft 118 to a position where the gear 138 comes into engagement with the gear 136, whereupon rotation of the shaft 118 will cause the selected fluid to be dispensed.

In order to maintain a selected pair of gears in engagement and to protect the mechanism against any inadvertent shifting of the selector shaft 118 during the operation thereof, I provide a circular or arcuate locking member 140 which may be mounted by any suitable means on the bracket 122. This member is provided with a plurality of grooves corresponding to the number of positions which may be assumed by the selector shaft 118. A mutilated disc 142 is mounted on the shaft 118 adjacent the member 140 and has its periphery so formed as to fit snugly into the grooves on said member 140. Referring momentarily to Fig. 8, it will be seen that the disc 142 is circular except for a substantially flat section 144. When the shaft 118 and the disc 142 are properly rotated to a position where a shifting of the selector shaft 118 is to take place, the position of the disc 142 will be like that shown in Fig. 8 where the peripheral edge of the disc 142 has been removed from a corresponding groove on the member 140 and the cut-away portion 144 thereof will have been moved to the position shown. This will permit a longitudinal shifting of the selector shaft to engage a selected pair of gears. During the dispensing operation which takes place after the selector shaft has been properly shifted, the periphery of the disc 142 will ride within one of the grooves on the member 140, during which time no longitudinal movement of the selector shaft can take place.

It is also desirable to provide a mechanism for preventing any inadvertent rotation of the other gears associated with a non-selected valve or dispensing means, and consequent actuation of the non-selected pistons during reciprocation of the one selected. This may never occur, but in the event that there should be any tendency for this to happen, means have been provided to prevent such action. With respect to the first valve or cylinder 66, such mechanism includes a hub or collar 146 connected to the gear 116 having a cut-out portion or peripheral slot 148 around its periphery. This is adapted to cooperate with a radially extending arm 150 secured to the shaft 110, which arm 150 is provided with an arcuate concave outer end 152. The curvature of this portion is identical with that of the periphery of the hub 146 so that in the normal position of the two members as shown in Fig. 7, a portion of the periphery of the hub will be received within the concave portion on the outer edge of the arm 150. This will permit longitudinal reciprocation of the selector shaft, and when the two gears 116 and 114 are in mesh, the outer concave end of the arm 150 will be in alignment with the slotted portion 148 (Fig. 3). Thus rotation of the selector shaft 118 which causes the shaft 110 to rotate will also cause a rotative movement of the arm 150. This movement will be permitted with respect to the selected valve because the cut-out portion 148 will permit the arm 150 to be rotated. The arms associated with the non-selected pistons will have the outer concave ends thereof bearing against a solid portion of their respective hubs, as may be clearly seen in Fig. 3, so that any tendency which either of the gears 128 or 136 may have to be rotated will be prevented because of the respective positions of the arm and hub as shown in Fig. 7. Fig. 6 discloses the position of these various parts when the selected piston has been partially reciprocated.

From the foregoing, it will be evident that the novel selector and actuating means for dispensing a selective beverage ingredient includes, generally, a selector shaft which is mounted both for a longitudinal shifting movement and a rotative movement. The selector mechanism, which is actuated in response to an external control, will cause the selector shaft to be shifted to a position where a selected pair of gears come into engagement. After this operation, a suitable mechanism is operated to rotate the shaft to dispense a selected beverage.

*The selector mechanism*

The mechanism for selecting the proper dispensing valve by shifting longitudinally the selector shaft 118 and for rotating this shaft after a selection has been made may be more clearly understood in general by reference to Figs. 3, 4, 5, 10, 11 and 15. Although, in actual operation, the rotation of the selector shaft occurs after the shifting action, it is deemed more expedient for the sake of clarity and for purposes of the description to explain the rotating mechanism first. Referring first to Figs. 3 and 15, the selector shaft 118 extends beyond the supporting bracket 122 and has an enlarged sleeve 154 secured to the outer end thereof. The outer end of the sleeve is provided with a recess 156 adapted to receive one end 158 of a ball connecting link or coupler 160. The end 158 of this coupler has an elongated slot 162 extending inwardly on the upper side thereof (see also Fig. 5), for the purpose of receiving the downwardly extending end 164 of a hook-shaped releasable connecting pin 166. The other side of the pin indicated at 168 passes downwardly through the sleeve 154 and has threadedly secured to its outer end a headed nut 170 whereby a coiled compression spring 172 may surround the shank of the nut, bearing at one end against the underside of the head thereof and at its other end against the bottom of a recess 174 in the underside of the sleeve 154.

The construction of such a releasable connection will permit easy assembly of the coupler by merely compressing the spring 172 which will elevate the end 164 of the connecting pin and permit the insertion of the ball end 158 into the recess 156. The slot 162 therein will permit a longitudinal movement of the selector shaft 118, the sleeve 154 and pin 166, and at the same time when the coupler is caused to rotate, it will impart a rotative movement to the selector shaft 118 through these same connecting parts.

The other end of the coupler 160 is also in the form of a ball 176 and is adapted to be received within a recess 178 in the outer end of the enlarged head 180 of the shaft 182. This latter shaft is mounted for rotation in the spaced side members 184 and 186 of a bracket 188 securely mounted to the main mounting plate 38. A connecting pin 190 extends through the head 180 and the ball end 176 of the coupler whereby rotation of the shaft 182 will cause a rotation of the coupler 160 as well as the selector shaft 118.

A sleeve 192 having a pinion 194 thereon is adapted to receive the shaft 182 within the sides of the bracket 188 and to be secured thereto by means such as a pin or set screw 196. The pinion 194 is in constant engagement with the vertically reciprocating rack 198. Thus it will be seen that reciprocation of the rack 198 will rotate the pinion 194 and the shaft 182 on which it is mounted and rotate the selector shaft 118 through the medium of the coupler mechanism just described.

Reference will now be made to Figs. 3, 5 and 10 wherein it will be noted that the rack 198 is adapted to reciprocate vertically within guide means 200 mounted on the plate 38, and the lower end of the rack has a forwardly extending pin 202 to which the bracket 204 is pivotally mounted. The bracket 204 is provided with vertically spaced ears 206 and 208 which threadedly receive the screw threaded end 210 of a connecting link which has an opening in its upper end 212 to receive a pivot pin 214 mounted on the outer end of the rotary reciprocating arm 216. At this point it will be evident that movement of the arm 216 either upwardly or downwardly will carry with it the rack 198 through the pivotal connection therewith for purposes of rotating the selector shaft 118.

Fig. 10 shows more clearly the construction of this arm and the manner in which it is caused to reciprocate in a rotary movement. The opposite end of the arm 216 has a pivotal connection 218 with the main mounting plate 38 and is slotted as at 220 in the center thereof to receive the shaft 46 and permit reciprocation thereof. The arm is so formed that it may be provided with an upper cam roller 222 and a lower cam roller 224 both of which may be contacted at different times by the cam 226 mounted on the shaft 46 and adapted to rotate therewith. When the electric motor 40 begins to operate and to rotate the shaft 46, the arm 216 will be in its inoperative position as shown in Fig. 10. The cam 226 will immediately begin to rotate, but the dwell thereon is sufficient to permit the selector shaft to shift its position in accordance with the selection made before any reciprocation of the arm takes place for dispensing the beverage ingredient. However, after the cam 226 has been rotated a short distance so that the highest point thereon has cleared the upper cam roller 222, it will bear against the lower cam roller 224 and cause a downward movement of the arm 216 and the rack 198 connected thereto. Movement of the rack in this direction will cause a rotation of the selector shaft 118 and the mutilated gears 116, 130, and 138 in a counter-clockwise direction as seen in Fig. 6. This will, in turn, impart a rotation in a clockwise direction of one of the gears 108, 124 or 132, depending upon which one has been selected. This movement retracts the piston 88 to draw into its associated cylinder a measured quantity of a beverage ingredient all as explained hereinbefore.

The cam 226 is so arranged that after the piston has been moved to its uppermost position and has drawn a sufficient quantity of liquid therein, it will then contact the upper cam roller 222 to move the arm 216 and the rack 198 upwardly, thus moving the piston downwardly and dispensing the liquid contained in the cylinder.

The mechanism which causes the shifting movement of the selector shaft is also mounted on the main mounting plate 38 and has a suitable releasable connection with the selector shaft. Referring now to Figs. 3 and 15, it will be noted that one end of the sleeve 154 is provided with an annular flange 228, the edge of which is adapted to be received within an annular groove 230 which may be provided, for example, by means of the spaced apart nuts 232 and 234 threadedly secured to one end of the slidable shaft 236. Referring for the moment particularly to Fig. 3 where the details of a yieldable connection is illustrated, it will be seen that the opposite end of the slidable shaft 236 terminates in a length of smaller diameter as indicated at 238. A supporting bracket 240 has one end thereof extending downwardly as at 242 and a second plate or ear 244 also extending downwardly in parallelism therewith and is likewise secured to the bracket 240. The portion 238 of the shaft 236 extends through and is supported by these members 242 and 244.

The downwardly extending portion 242 is provided with an opening to receive a collar 246, which collar normally bears against the shoulder formed between the portions on the shafts 236 and 238, and has an annular flange thereon located against the inner side of the portion 242 and bearing thereagainst. A similar collar 248 is located adjacent the end of the shaft 238, is received by a suitable opening in the member 244, and has a similar annular flange on the inner end thereof which normally bears outwardly against the inner side of the member 244. A coiled compression spring 250 surrounds that portion of the shaft 238 within the confines of the members 242 and 244 and normally bears outwardly against the flanges on the collars 246 and 248. The outer end of the collar 248 normally bears against a suitable retaining nut 252 threadedly engaging the end of the portion of the shaft 238.

In the normal operation of the selecting or shifting movement, the entire bracket 240 will move toward the right or left, as the case may be, and will carry with it the two supporting members 242 and 244 together with the shaft 36 which will thereby shift the selector shaft 118 by reason of the peripheral edge of the flange 228 being received within the annular groove 230. The mechanism just described constitutes a yieldable connection to obviate any difficulties which might be encountered during the shifting of the various shafts in the event that some part of the shaft for any reason can not be moved. For example, if any of the operating mechanism connected with the selector shaft 118 should become out of alignment and can not be moved lengthwise, the selector mechanism will still move the mechanism connected with the shaft 236. If this occurs and, assuming for the moment that a selection has been made which will cause a shift toward the right, and the selector shaft 118 will not move, the bracket 40 and its connected members may still move toward the right, but the member 42 will slide over the collar 246 and the member 244 will compress the spring 250. Thus no damage will occur to the mechanism in this event. The result will be the same if a selection has been made which causes the mechanism to move toward the left, in which case the coiled compression spring 250 will be compressed toward the left by the supporting member 242 carrying with it the collar 246 which is slidable on the shaft 238.

Referring again to Figs. 3 and 15, a U-shaped strap 254 has a shelf 256 mounted at one end thereof which supports the bracket 240 by means of a pin 258 having a coiled spring 260 therearound, the ends of which extend forwardly and downwardly as at 262 and 264. This provides a pivotal connection between the shelf 256 and the bracket 240, and the end 262 of the spring 260 will bear against the forward side of the strap 254, while the other end 264 bears against the forward edge of the bracket 240. This construction normally maintains the bracket 240 and its connected parts in alignment with the portions 236 and 238 of the shaft, but will permit a slight lateral movement thereof if such becomes necessary during operation of the machine.

The strap 254 is suitably mounted on the forward side of a bracket 266 which has outwardly extending end portions 268 secured to the mounting plate 38 for lateral sliding movement by means of the pin 270 and the slot 272. A pin 270 is located in each of the ends 268 and each passes through a slot 272 whereby the bracket 266 is secured to the mounting plate and yet is such as to permit a horizontal sliding movement thereof. Thus it will be evident that when the bracket 266 carrying the strap 254 is caused to move either toward the right or toward the left, it will carry with it the supporting bracket 240 and all of the mechanism connected therewith as explained above to thereby cause a longitudinal shifting of the selector shaft 118.

The actual selection is made by energizing an electrical circuit from suitable external controls on the machine. In the present embodiment of the invention, two solenoids 274 and 276 are located between the strap 254 and the bracket 266 and have the plungers 278 and 280 associated therewith. The plunger 278 has a collar 282 located adjacent the rear end thereof which collar is provided with an annular groove 284. Similarly, the plunger 280 has a collar 286 secured thereto, which collar has an annular groove 288. When a selection is made, either of the solenoids may be energized, or neither solenoid may be energized, depending upon the selection made. In the present illustration, if the beverage ingredient has been selected which is dispensed from the piston 66, it will be necessary that the selector shaft 118 will be moved to its extreme righthand position as shown in Fig. 3. In this event, the solenoid 274 will be energized. If on the other hand, a beverage ingredient has been selected which is to be dispensed from the cylinder 70, then the selector shaft 118 must be moved to its extreme lefthand position, and to do this, the solenoid 276 would be energized. If the beverage ingredient is to be dispensed through the center cylinder 68, then neither of the solenoids will be energized. The means of energizing these solenoids and for shifting the selector mechanism will be described hereinafter.

A centering device is provided whereby, when one of the solenoids is energized and draws its associated plunger inwardly, the plunger of the other solenoid will be moved outwardly, and for this reason suitable openings 290 and 292 are located in the supporting plate 38 to permit either of the plungers to be moved outwardly or rearwardly a suitable distance for the selecting mechanism to function.

While any suitable device may be used to cause this alternate movement of the solenoid plungers, one form of device is more particularly illustrated in Fig. 17 where the centering device is generally indicated by the numeral 294 and is shown in perspective looking toward the rear side thereof. This device consists of a front supporting plate 296 adapted to be mounted on the inner side of the bracket 266, and is provided with rearwardly extending ears 298 and 300, one at each end thereof. Ears 302 extend rearwardly from the upper and lower edges of the plate 296 whereby suitable means, such as a wire strap 304, may be utilized to pivotally support a rear plate 306 through forwardly extending upper and lower flanges 308 and 310. The wire strap 304 may embrace the bracket 266 as shown in Fig. 15 and have its upwardly and downwardly extending ends received within suitable openings in the upper and lower ears 302. These ends may then extend through suitable openings in the flanges 308 and 310 whereby a pivotal or rotative movement of the plate 306 may take place.

Outwardly extending ears 312 and 314 are located at each end of the plate 306 and have elongated openings 316 and 318 therein to receive the rearwardly extending ears 300 and 298 respectively. A face plate 320 is yieldably mounted on the rear side of the plate 306 by means such as the headed pins 322. These pins extend through the two plates 306 and 320 and have the heads thereof spaced from the plate 306 to accommodate a coiled compression spring 324. The ends of the face plate 320 normally bear against the ends of the two ears 298 and 300 so that when any pivotal movement of the plate 306 takes place, such for example as that shown in Fig. 16, the face plate 320 will be allowed to move away slightly from the plate 306. The end extensions or ears 312 and 314 extend into the respective annular grooves 288 and 284 of the collars 286 and 282 whereby an inward movement of one of the plungers will cause an outward movement of the other plunger. This action is clearly illustrated in Fig. 16 where the solenoid 276 has been energized to draw the plunger 280 inwardly. When this action takes place, the pivotal or rotative movement of the plate 306 will cause an outward movement of the plunger 278 associated with the unenergized solenoid 274. If the solenoid 274 is energized, then the opposite action will take place, the plunger 278 being drawn inwardly and the plunger 280 being forced outwardly.

Suitable mechanism is provided for shifting the selector shaft in either of two directions depending upon which of the solenoids 274 or 276 have become energized. The actuating mechanism for the shifting operation includes a vertically reciprocating selector bar 326 (see Fig. 12). The upper edge of this bar is tapered inwardly and upwardly at each side thereof as shown at 328 and 330. A slot 332 extends downwardly from the upper edge of the bar 326 at substantially the center thereof, which slot receives and embraces the inner end of the shaft 52. Suitable collars or retaining rings 334 are located on the shaft 52 and at each side of the bar 326.

Near the lower end of the selector bar 326, it is provided with another elongated slot 336 adapted to receive the main shaft 46. The two slots 332 and 336 being for the purpose of allowing the bar 326 to reciprocate vertically.

A cam 338 having substantially the configuration shown in Fig. 12 is secured to the shaft 46 and rotates therewith. The reciprocating bar 326 is provided with upper and lower spaced cam rollers 340 and 342 adapted to be in contact with the edge of the cam 338 at all times. The position of the cam shown in Fig. 12 is the normal inoperative position which it assumes when the machine is not in operation. As soon as the motor 40 is energized to rotate the shaft 46, the cam 338 will rotate in a clockwise direction, and it is normally so positioned with respect to the upper cam roller 340 as to immediately slide the selector bar 326 upwardly. After this bar reaches its uppermost position, it remains there until the cam 338 forces it downwardly by contact with the roller 342. The selector bar 326 is adapted to reciprocate between the solenoid plungers 278 and 280. If the selector shaft 118 is in its neutral or central position and is to remain in that position during a cycling of the machine, then neither of the solenoids 274 or 276 will become energized. In this event, when the selector bar 326 is moved upwardly, it will pass between the two plungers 278 and 280 without causing any shifting thereof in either direction.

On the other hand, if a beverage ingredient has been selected to be dispensed from cylinder 70, which necessitates a shifting of the selector shaft 118 toward its extreme lefthand position, then solenoid 276 will be energized to draw the plunger 280 inwardly and move the plunger 278 outwardly in the manner above described. At this point the position of the various parts will be like that shown in Fig. 16. The collar 282 on the plunger 278 will then be in alignment with the edge of the selector bar 326, whereupon, when the selector bar is elevated, the collar 282 will contact the tapered edge 328 of the selector bar which has a camming action and will move the solenoid, the bracket 266 and strap 254 on which it is mounted, the bracket 240, shaft 236 and selector shaft 118 toward the left.

If the beverage ingredient is to be dispensed from the cylinder 66, then the opposite movement will take place wherein the plunger 280 will be moved to the outer position, the collar 286 thereon then being in alignment with the righthand edge of the selector bar 326. On elevation of the selector bar, the edge thereof will contact the collar 286 and shift the entire mechanism toward the right.

At the end of a cycle, all of the parts comprising the shifting mechanism will remain in their position which they assumed during that cycle. For example, if it is considered that the machine has just completed a cycle for dispensing a beverage ingredient from the cylinder 66 wherein the parts of the shifting mechanism will be in their position as shown in Fig. 3, the parts do not return to any neutral position, but will remain as shown until the next cycling of the machine. If the next succeeding customer selects the same beverage ingredient as was dispensed during the last cycling of the machine, then no shifting of the mechanism will take place. The same solenoid will be energized and the selector bar 326 will be reciprocated in the same manner as above described, but the movement of the selector bar will have no effect as to any further movement of the parts.

If the shifting mechanism, however, is in either of its two extreme positions toward the left or right at the end of a cycle and the next customer selects a beverage ingredient to be dispensed from the center cylinder 68, then neither solenoid will be energized. The two plungers 278 and 280 will remain in their normal position as shown in Fig. 15, but they will have been moved either toward the right or to the left from the preceding cycle. In this event, an upward movement of the selector bar 326 will contact the outer end of one of the plungers to thus shift the mechanism to its center or neutral position.

The draining mechanism

For the sake of clarity, it is deemed more expedient for purposes of description to complete the mechanical details of the machine before referring to the wiring diagram and a description of the electrical circuits which operate the machine.

It occasionally becomes necessary for changing one or more of the beverage ingredients located in the storage tanks within the machine. This may occur for various reasons, for example, it may not be easily determined in advance in certain sections of the country as to what beverages are usually more popular than others in which event, if one of the beverages did not sell, it would be advisable to remove the beverage ingredient and place another more salable ingredient in its stead. This problem becomes one which cannot be solved by merely removing and emptying one of the storage tanks, since conduits connected with each tank maintain a constant flow of the liquid therein into the upper part of each of the cylinders wherein the reciprocating piston is located for dispensing the liquid. It thus becomes necessary to provide some means by which all of the liquid can be drained from the storage tank and from the valve assembly in order to replace the liquid with a different kind.

The mechanism illustrated herein for accomplishing this purpose is more clearly shown in Fig. 6 where a poppet valve 344 having a side opening 346 therein is slidably mounted within a passage 348. The upper end of this valve is provided with a disc 350 adapted to seat against that portion of the valve assembly immediately surrounding the passage 348. A small coiled compression spring 352 having one end thereof seated in a recess 354 is adapted to bear downwardly at its outer end against the upper end of the valve to thus normally maintain it in a closed and inoperative position. A laterally extending finger 356 protrudes into the cylinder 84 immediately above the top end of the piston 88 and is in alignment with a recess or cut-away portion 358 at one side of the piston. This construction will normally permit reciprocation of the piston 88 until the bottom 360 of the recess 358 reaches the finger 356. During normal operation of the machine the piston does not move beyond this point when it is retracted to draw into the cylinder a measured quantity of the beverage ingredient.

It must be kept in mind that the upper part of the cylinder 84 has the beverage ingredient located therein at all times and when it is desired to drain the liquid, it is merely necessary to open the valve 344 by pressing upwardly on the finger 356. This will bring the side opening 346 in alignment with the lateral passage 362 so that the liquid will pass into the passage 348 through the side opening 346. A transversely extending passage 364 extends throughout the width of the valve mechanism and is adapted to be in communication with each of the passages 348 associated with each dispensing mechanism, so that when the liquid from any one storage tank is caused to pass downwardly through one of the passages 348, it will be carried through the passage 364 to the drainage spout 366 connected thereto. It will thus be evident that the drainage mechanism has been greatly simplified and the only operation necessary is to elevate or open the valve 344 by means of pressure against the finger 356. One of these valves is associated with each dispensing mechanism so that any one of the beverage ingredients may easily be drained and replaced with one of a different kind.

The electrical circuit

The wiring diagram illustrated in Fig. 19 indicates the essential elements of the electrical circuit of the machine and the manner in which each is operated for the selection and dispensing of a particular beverage ingredient. As stated above, the external controls on the machine, such as the usual push-buttons, are not included in the showing of the mechanical details hereof, but are indicated in Fig. 19 as push-buttons numbered 1, 2 and 3. Such an indication of these external controls is believed sufficient inasmuch as their connection in the electrical circuit is clearly illustrated.

The essential elements of the electrical circuit include a coin trip switch 367, the holding relay 368, the actuating motor 40, the relay armature 370 which is actuated by the relay coil 368, the selector relays numbered 1, 2 and 3, the two solenoids indicated at 274 and 276 and the two switches 372 and 374. As will be seen later, each of the selector relay coils 1, 2 and 3 is adapted to actuate a pair of contacts connected thereto for purposes which will become more apparent hereinafter.

Normally, when the machine is inoperative all circuits thereof are open so that the actuation of any of the push-buttons will have no effect. The first operation of a customer will be to deposit an acceptable coin. If the coin is not acceptable, it will be rejected by the use of any well known scavenging means currently used in coin mechanisms for this purpose. The deposit of an acceptable coin will momentarily close the normally open coin trip switch 367 which will close the circuit between the two sides of the line 376 and 378, energizing the holding relay coil 368. In following the diagram, the side of the line indicated at 376 may be termed the live side and 378 may be called the grounded side of the line. In order to facilitate an understanding of the diagram, the live side of the line is shown in slightly heavier lines than the grounded side thereof. The live side of the line is connected directly to the trip switch 367 and the grounded side of the line 378 carries current through the branch 380, through the normally closed switch 372, to the branches 382, 384 and 386 to the coil 368 of the holding relay. Since the switch 370 is normally open, the current will follow the branch 76 on the live side of the line to the switch 367. It will then be obvious that, since the holding relay coil 368 is included in this circuit, when the trip switch 367 is momentarily closed by the depositing of an acceptable coin, the coil 368 will be energized and close the switch 370. The trip switch 367 will immediately open, but will then have no effect on the circuit because the switch 370 is being held in closed position by the energized holding relay coil 368.

The next operation of the customer is to select one of the beverages to be dispensed by actuating one of the push-buttons 1, 2 or 3. When push-button number 1 is actuated, it is so arranged as to energize the selector relay number 1 and the valve solenoid 274. Obviously the push-button can not remain in its actuated position, and for this reason the energizing of the selector relay number 1 will move the blade of the single-pole double-throw switch 390 from its normal position shown in Fig. 19 to its other contact 392 which connects the selector relay number 1 directly across the live and grounded sides of the line. Before push-button number 1 is actuated, but after a coin has ben deposited, current from the live side of the line is normally passing therethrough. This may be followed by explaining that the current from the live side of the line 376 is passing through the switch 370 to the branch 388 and all of the switches 390, 394 and 396, to the branches 398 and 400 to the switch 402 of push-button number 1. When this latter switch is closed by actuation of the push-button, the current continues through the branch 404 to the coil 406 of selector relay number 1 and back to the grounded side of the line 384. This current is also carried from the branch 404 to the solenoid 274 and back to the grounded side of the line 384 through the branch 408. As soon as the coil 406 of the selector relay number 1 has been energized, it will move the switch 390 over to its contact 392 thus connecting the solenoid directly across the live and grounded sides of the circuit. The same is true for the solenoid 274 and thus both solenoids will remain energized until the entire circuit is opened at the end of a cycle as will be explained more fully hereinafter.

A plurality of motor switches are associated, one with each of the push-buttons, and each is adapted to be closed upon energizing the solenoid associated with each of the selector relays, so that upon the closing of one of these switches, the motor 40 will begin operation to start the cycle of the machine. These motor switches are indicated by the numerals 410, 412, and 414, the switch 410 being associated with the selector relay number 1 and will close as soon as the coil 406 has become energized. At this time the current will then flow from the live side of the line through the branches 368 and 416 through the switch 410 and the branches 418 and 420 to the single-pole double-throw switch 374. From here the current then flows through the branch 422 to the motor 40 and to the grounded side of the line through the branch 380. As soon as the motor 40 starts to function, it will mechanically throw the blade of the switch 374 over to the other contact 424 thereof, thus connecting the motor 40 directly across the live and grounded sides of the line through the branches 426 and 428. The motor will then continue to run as long as this circuit is closed, but mechanical means connecting the motor to the switch 374 will open this switch at the end of the cycle of the machine which then stops the motor. The de-energizing of the solenoid 274 and relay 406 as well as the holding relay 368 is accomplished by breaking and again making the circuit through switch 372, also by mechanical means from the motor, immediately before opening switch 374. Thus the end of the cycle will cause the opening of all circuits and a resetting of the machine for the next cycle.

As explained above, when a beverage ingredient is selected to be dispensed from the center cylinder, neither of the solenoids 274 or 276 will be energized. Thus, when push-button number 2 is actuated and the switch 430 thereof is moved momentarily to its other contact, the circuit will be completed through the coil 432 of selector relay number 2 from the live side of the line through the branch 400, through the switch 430 and the branch 434, to the grounded side of the line through the branch 384. The energizing of the coil 432 will immediately close the motor switch 412 associated therewith and will move the blade of switch 394 to its other contact 436 whereupon the motor will start and the coil 432 will remain energized by reason of its direct connection between the live and grounded sides of the line through the branches 368 and 384. Here again, as soon as the motor starts to function, the full stroke switch 374 will be moved to its contact 424 whereupon the motor will be connected directly across the live and grounded sides of the line and continue to function for a complete cycle of the machine until the switches 372 and 374 are opened by operation of the motor to open all of the circuits.

If it is desired then to select a beverage ingredient to be dispensed through cylinder 70, push-button number 3 will be actuated to move the blade of its associated switch 438 to its other contact, whereupon current will then flow through the branch 438 to energize the solenoid 440 of selector relay number 3. Upon energizing solenoid 440, the motor switch 414 associated therewith will immediately be closed to start the motor 40 and the single-pole double-throw switch 396 will be moved to its contact 442 to connect the solenoid 440 directly across the live and grounded sides of the line in the same manner as explained above with respect to the other selector relays.

The full stroke switch 374 has not been illustrated in the drawings, since any suitable connection between this switch and the motor may be utilized for moving the blade thereof to its other contact 424. It may, if desired, be located on the main mounting plate 38 or at any other suitable location within the machine.

The switch 372 is mounted preferably on the plate 38 and the manner of its operation will be more clearly understood by viewing Figs. 3 and 5. A cam 444 is secured to the shaft 46 for operating the carbonated water valve and is provided with a radially extending contact member 446 adjacent the periphery thereof. This member 446 is adapted to contact the upper end of an actuating arm 448 in the form of a bell crank lever pivotally mounted to the main mounting plate 38 by means of a pivot pin 450. The other arm 452 of the bell crank lever is adapted to contact the blade 454 of the switch 372, normally holding it in a closed position. A suitable spring 456 coiled around the pin 450 and having one end 458 bearing against one arm of the bell crank 448 and its other end 460 bearing against a pin 462 normally holds the arm of the bell crank against the contact member 446. The cam 444 will normally rotate in a clockwise direction with the shaft 46 and the normal position of the contact member 446 will be like that shown in Fig. 5. As the motor rotates the cam 444, it will make one complete revolution during the cycle of the machine so that just prior to its return to its normal position, it will move the bell crank 448 to open the switch 372. As soon as this switch is open, then, the circuits to the solenoids 274, 368 and 406 will be broken, thus de-energizing these solenoids. When this occurs, the switches 398 and 410 will return to their normal positions as well as the switches 370 and 374, thus resetting the entire circuit in readiness for the next succeeding cycle. This is assuming that push-button number 1 has been actuated, but the same relative action takes place with respect to the solenoids and switches associated with the other circuits if push-buttons numbered 2 or 3 have been actuated.

The carbonated water valve 464 (see Fig. 14) may be of the usual type of construction having a restrictor 466 connected thereto and the spout 468. The valve is operated by longitudinal reciprocation of the bar 34 through its connection with an arm 470 on the valve itself. The bar 34 is reciprocated by the cam 444 (see Fig. 5) through the operation of a cam roller 472 on the end thereof and a rotating arm 474 pivotally mounted on one of the spacer members 50. A spring 476 normally urges the bar and its connected cam follower in a direction to bear against the peripheral edge of the cam 444. This cam is so shaped that during a revolution thereof in a clockwise direction, it will force the arm 34 toward the right and actuate the valve 464 to dispense a predetermined amount of carbonated water into the receptacle simultaneously with a dispensing of the syrup or other suitable beverage ingredient from one of the cylinders 66, 68, or 70.

The visibility feature

As stated hereinbefore, one of the features of the present invention is the provision of suitable means and a novel construction whereby a dispensing and mixing of the beverage ingredients is made visible so that it may be seen by a customer. The transparent construction of the valve assembly, generally indicated by the numeral 14, has been explained above and the completed assembly may be more clearly understood by viewing Figs. 1 and 14.

A transparent hood 478 is adapted to enclose the transparent valve assembly and is provided with an opening 480 in the bottom thereof through which the spout 74 carrying the passages 76, 78 and 80, the drainage spout 364 and the carbonated water spout 468 may extend in order that the liquid being dispensed therethrough may reach the receptacle. A metallic shroud 482 extends inwardly from the rear side of the door 4 and has an opening 484 in the rear side thereof adapted to receive the hood 478 and the valve assembly located within the confines thereof. Fig. 14 is a vertical sectional view through the machine at the center thereof when the door is closed where it will be seen that the shroud 482 extends inwardly and one edge of the opening 484 is indicated by the numeral 486. The lower side of the shroud contains an opening 488 in communication with the larger opening 484 whereby the customer may look through this opening and see the beverage ingredients being dispensed.

A glass or other transparent sheet material 490 is suitably mounted at the front of the machine whereby a customer may view the operations of the various pistons within the cylinders due to the transparency of the cylinders and the hood 478. Since the spout 474 is also formed of a transparent material, the colorful liquid of the beverage ingredient, particularly if it is a syrup for the production of a carbonated beverage, may be seen as it is drawn into the cylinder and forced outwardly therefrom through the spout.

As has been indicated above, a special problem in constructing the valve assembly presented itself in the attempt to make it transparent so that the dispensing of the various liquids could be seen. It became necessary to extend the various pistons and cylinders toward the front of the machine beyond the point where they might otherwise need to be located if the dispensing were not to be viewed by a customer as in machines of this character heretofore known.

A small door is adapted to be located at the front of the machine having a transparent and movable closure member 492 therein, which door may be opened after the completion of the cycle of the machine for removing the receptacle containing the mixed beverage. This door construction may be of any suitable nature and in the present instance comprises upper and lower grooves 494 and 496 within which the upper and lower edges of the closure member 492 may be slidably mounted, whereby it may be moved to one side of the opening for removing the receptacle.

The operation of the machine

To facilitate an understanding of the functions of the various parts of the machine, the operation thereof will be followed through a typical cycle. When the machine is in its normal inoperative position, all of the various parts will be in the positions as shown in the various figures of the drawings with the possible exception of the selector shaft 118 as illustrated in Fig. 3. The position of this shaft will depend upon the beverage ingredient selected for the previous cycle of the machine. In the position of the selector shaft shown in Fig. 3, the last preceding customer had selected a beverage ingredient to be dispensed through the cylinder 66. If either of the other beverage ingredients had been selected, the selector shaft 118 would be located in either of its other two positions where the gears 128 and 130 or the gears 136 and 138 would be in mesh.

As a customer approaches the machine, the various switches and the electrical circuit will be in their respective positions as shown in the wiring diagram of Fig. 19. If the customer first actuates any of the external controls or push-buttons without first depositing a coin, nothing will happen because the circuit between the high and low sides of the line will not be energized. In order to energize any of the circuits, it is necessary that either the coin trip switch 367 or the holding relay switch 370 be closed. If the customer then deposits a spurious coin, the usual and customary scavenging means in the well known form of coin mechanisms will operate to reject the coin and return it to the customer.

If the customer now drops an acceptable coin, it will first momentarily close the coin trip switch 367 to close the circuit between the high and low sides of the line, thus energizing the holding relay solenoid 368 which closes the switch 370 and completes the circuit. At this point, however, nothing further will occur until the customer makes a selection and actuates one of the push-buttons to close one of the switches 402, 430 or 436. Assuming that the customer selects the beverage ingredient which is to be dispensed through cylinder 70, he will then actuate push-button number 3 to momentarily close the switch 436. As explained above during the description of the wiring diagram, a closing of the switch 436, or a movement of the blade thereof to its other contact, will energize the solenoid 440 of the selector relay number 3 as well as the solenoid 276. When the selector relay solenoid 440 is energized, it will mechanically move the blade of switch 396 over to its contact 442 and will close the motor switch 414.

The energizing of the solenoid 276 will draw the plunger or armature 280 inwardly to the position shown in Fig. 16 at which time the centering device will cause an outward movement of the armature 278 of the solenoid 274 to bring the edge of the collar 282 mounted thereon in alignment with the edge of the selector bar 326. Closing the switch 414 will immediately start the motor 40 which, in turn, will mechanically actuate the switch 374 to move the blade thereof to its other contact 424, thus connecting the motor directly across the high and low sides of the line. This operation of the switch 274 will open the circuit through the switch 414 permitting it to immediately return to its normal position shown in the wiring diagram. The circuit through the solenoids 440 and 276 however remains energized so that the switch 396 will remain in its actuated position.

As soon as the motor 40 starts to operate, the shaft 46 will rotate and simultaneously cause a number of things to take place. Through the gear train consisting of the gears 58, 60 and 64 (see Figs. 4 and 5), the crank 54 will be caused to revolve, thus reciprocating the link 20 (Fig. 1) to operate the cup dispenser 22 which releases a receptacle through the chute 26 and deposits it on the support 30 immediately below the dispensing spouts of the valve assembly. At the same time cam 338 will begin to rotate from its position as shown in Fig. 12 to thereby elevate the selector bar 326 to its position as shown in Fig. 13. At this point it will be noted that since the energized solenoid 276 has acted to move the armature of the solenoid 274 outwardly, when the selector bar 326 is moved upwardly it will contact the edge of the collar 282 and shift the entire mounting assembly toward the left. This mounting assembly will include the bracket 266 and strap 254 on which is mounted the bracket 240. A movement toward the left of the bracket 240 will carry with it the shaft 236 and the sleeve 154 connected to the selector shaft 118 (see Fig. 3). This shift to the left will bring the two gears 136 and 138 of the selector mechanism in mesh with each other so that proper rotation thereof will dispense a beverage ingredient through the cylinder 70.

As soon as the selecting action has been completed, the rotation of cam 226 will begin actuation of the arm 216 to move the rack 198 downwardly from its position as shown in Fig. 10. This downward movement of the rack 198 will cause a counterclockwise rotation of the selector shaft 118, as viewed from the left in Fig. 3, and a rotation of the shaft 134 in the opposite direction to retract the piston located within the cylinder 70 in accordance with Fig. 6. This rotation of the piston will draw a measured quantity of a beverage ingredient into the cylinder. After the piston is retracted its full amount, the cam 226 will then contact the cam follower 222 to move the arm 216 and the rack 198 upwardly. This movement will cause the piston within the cylinder 70 to dispense the liquid therein through the passage 80 and into the receptacle located thereunder.

Also during this operation cam 444 will be rotating to cause a reciprocation of the link 34 connected to the carbonated water valve whereby the proper amount of water will be dispensed during the dispensing of the syrup so that the two liquids will become thoroughly mixed as they are deposited into the receptacle to form the completed beverage.

At the end of the cycle, the contact member or pin 446 on the cam 444 (see Fig. 5) will contact the upper arm of the bell crank lever 448 to momentarily open the switch 372. As explained above, the opening of this switch breaks the circuit to the motor as well as to the energized solenoids, whereupon the switch 370 will be opened as well as the switch 396. The solenoid 276 will also be de-energized and will return to its normal position as shown in Fig. 15. Furthermore, the switch 374 will be returned to its normal position as shown in the wiring diagram and the switch 372 will also be returned to its normal closed position whereupon all of the circuits will be opened and the various switches thereof will be normalized as illustrated.

From the foregoing description it will become apparent that I have provided novel actuating means in a selective beverage vending machine which constitutes an improvement over those heretofore known and which will permit the customer to actually view the dispensing and mixing operations of the beverage ingredients. It will be evident that changes may be made in the form, construction and arrangement of parts from those disclosed herein without in any way departing from the spirit of the invention or sacrificing any of the attendant advantages hereof, provided, however, that such changes fall within the scope of such claims appended hereto.

Having thus described our invention, what we claim as new and desire to secure by Letters Patent of the United States is:

1. In a selective beverage vending machine of the class described, a plurality of sources of supply for beverage ingredients, a plurality of cylinders each in communication with one of said sources of supply, a reciprocating piston in each cylinder adapted to dispense a measured quantity of a beverage ingredient into a receptacle, actuating means including a rack and pinion individual to each piston and in continuous engagement with each other, and driven gear means operatively associated with said pinion and adapted to be selectively engaged for reciprocating a selected piston, motive means for selectively engaging said gear means thereby to operate said actuating means, a plurality of external controls, and means responsive to the actuation of a selected external control to operate said motive means and dispense a selected beverage ingredient in accordance with the external control selected.

2. In a selective beverage vending machine of the class described, a plurality of sources of supply for beverage ingredients, a plurality of cylinders each in communication with one of said sources of supply, a reciprocating piston in each cylinder adapted to dispense a measured quantity of a beverage ingredient into a receptacle, combined selecting and actuating means including a slidable shaft having a plurality of spaced driving gears thereon, dispensing means for reciprocating a selected piston including individual rack and pinion means in continuous engagement with each other and with said piston and driven gear means operatively associated with said pinion adapted to be selectively engaged, motive means for sliding and rotating said shaft whereby a selected piston is reciprocated, a plurality of external controls, and means responsive to the actuation of a selected external control for operating said motive means to thereby dispense a selected beverage ingredient in accordance with the external control selected.

3. In a selective beverage vending machine of the class described, a plurality of sources of supply for beverage ingredients, a plurality of dispensing means for dispensing the beverage ingredients from said sources of supply into a receptacle, said dispensing means including individual rack and pinion means in continuous engagement with each other and driven gear means operatively associated with said pinion adapted to be selectively engaged by an actuating means, a plurality of actuating means shiftable as a unit to different positions for selecting a dispensing means to be actuated thereby, motive means for driving said actuating means after a selection has been made, a plurality of external controls, and means responsive to the actuation of a selected external control to operate said motive means and dispense a selected beverage ingredient in accordance with the external control selected.

4. In a selective beverage vending machine of the class described, a plurality of sources of supply for beverage ingredients, a plurality of dispensing means for dispensing the beverage ingredients from said sources of supply into a receptacle, said dispensing means including individual rack and pinion means in continuous engagement with each other and driven gear means operatively associated with said pinion adapted to be selectively engaged by an actuating means, a plurality of actuating means shiftable as a unit to different positions for selecting a dispensing means to be actuated thereby, motive means including a reciprocating bar for shifting said actuating means and for driving said actuating means after a selection has been made, a plurality of external controls, and means responsive to the actuation of a selected external control to operate said motive means and thereby dispense a selected ingredient in accordance with the external control selected.

5. In a selective beverage vending machine of the class described, a plurality of sources of supply for beverage ingredients, a plurality of cylinders each in communication with one of said sources of supply, a reciprocating piston in each cylinder adapted to dispense a measured quantity of a beverage ingredient into a receptacle, dispensing means including individual rack and pinion means in continuous engagement with each other and with said piston and driven gear means operatively associated with said pinion adapted to be selectively engaged by an actuating means, a plurality of actuating means shiftable as a unit to different positions for selecting a dispensing means to be actuated thereby, motive means for driving said actuating means after a selection has been made, a plurality of external controls, and means responsive to the actuation of a selected external control to operate said motive means and thereby dispense a selected beverage ingredient in accordance with the external control selected.

6. In a selective beverage vending machine of the class described, a plurality of sources of supply for beverage ingredients, a plurality of cylinders each in communication with one of said sources of supply, a reciprocating piston in each cylinder adapted to dispense a measured quantity of a beverage ingredient into a receptacle, dispensing means including individual rack and pinion means in continuous engagement with each other and with said piston and driven gear means operatively associated with said pinion adapted to be selectively engaged by an actuating means, a plurality of actuating means shiftable as a unit to different positions for selecting a dispensing means to be actuated thereby, means including a reciprocating bar for shifting said actuating means and motive means for driving said actuating means after a selection has been made, a plurality of external controls, and means responsive to the actuation of a selected external control to operate said motive means and thereby dispense a selected beverage ingredient in accordance with the external control selected.

7. In a selective beverage vending machine having a plurality of sources of supply for beverage ingredients, and dispensing means associated with each source of supply for dispensing a selected beverage ingredient into a receptacle, means for selecting and actuating a selected dispensing means comprising a longitudinally shiftable and rotatable selector shaft, means on said shaft adapted to engage a selected dispensing means when properly shifted and to actuate the selected dispensing means when rotated, motive means for shifting said shaft and for rotating the shaft, a plurality of external controls, and means responsive to the actuation of a selected external control to operate said motive means, whereby said shaft is shifted to the proper position and then rotated to dispense the selected beverage ingredient.

8. In a selective beverage vending machine having a plurality of sources of supply for beverage ingredients, and dispensing means associated with each source of supply for dispensing a selected beverage ingredient into a receptacle, means for selecting and actuating a selected dispensing means comprising a longitudinally shiftable and rotatable selector shaft, means on said shaft adapted to engage a selected dispensing means when properly shifted and to actuate the selected dispensing means when rotated, motive means including an electric motor, a selector bar adapted to be reciprocated by said motor, means associated with said selector shaft and movable into and out of the path of said selector bar whereby said shaft may be shifted by the reciprocating movement of said bar, means operable by said motor to rotate said shaft after it has been properly shifted to thereby dispense a selected beverage ingredient, a plurality of external controls, and means responsive to the actuation of a selected external control to operate said motor and said means connected to the selector shaft.

ERNEST H. THOMPSON.
LEO W. DOGGETT.

REFERENCES CITED

The following references are of record in the file of this patent:

UNITED STATES PATENTS

| Number | Name | Date |
|---|---|---|
| 1,318,718 | Belk | Oct. 14, 1919 |
| 1,911,151 | Halstead et al. | May 23, 1933 |
| 2,096,013 | Sutton et al. | Oct. 19, 1937 |
| 2,096,522 | Lambert | Oct. 19, 1937 |
| 2,144,465 | Selleck | Jan. 17, 1939 |
| 2,376,403 | Thompson et al. | May 22, 1945 |